Oct. 3, 1967     W. BINGMANN ET AL     3,344,990
ELECTRICALLY INSULATING RAIL JOINT CONNECTIONS
Filed Sept. 28, 1964
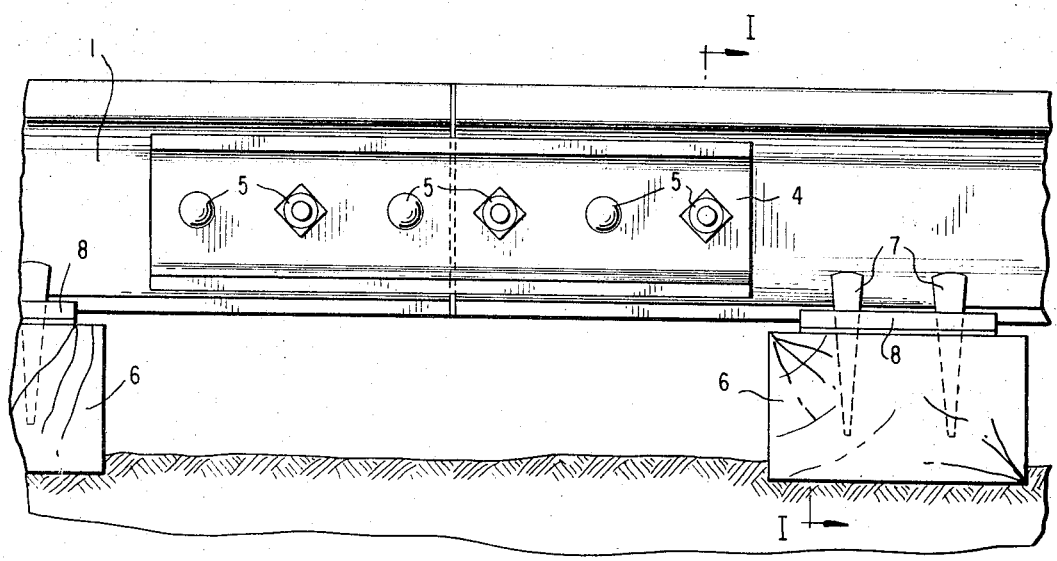
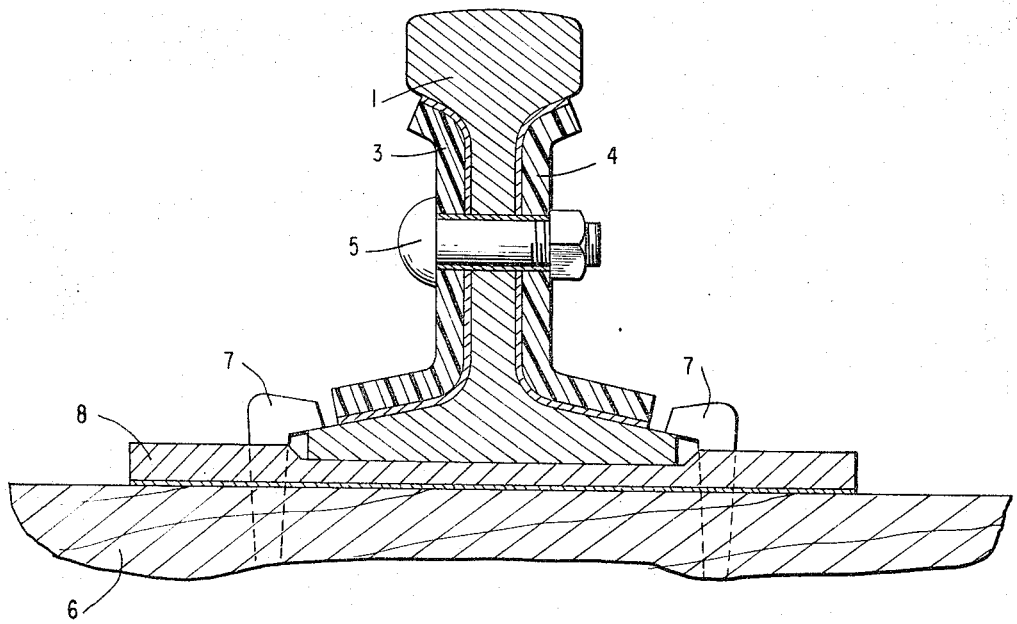
INVENTORS
WALDEMAR BINGMANN
ERICH BEHR

United States Patent Office 3,344,990
Patented Oct. 3, 1967

1

3,344,990
ELECTRICALLY INSULATING RAIL JOINT CONNECTIONS
Waldemar Bingmann, Essen, and Erich Behr, Troisdorf, Germany, assignors to Dynamit Nobel Aktiengesellschaft, Troisdorf, Germany
Filed Sept. 28, 1964, Ser. No. 399,556
Claims priority, application Germany, Sept. 26, 1963, D 42,564
16 Claims. (Cl. 238—159)

The present invention relates to electrically insulating connections made of a plastic material, and more particularly to electrically insulating plastic connections for rail joints.

Railroad tracks consist in general of individual rails connected to each other. It is thereby necessary that the rails are connected as securely and rigidly as possible at the place where they come together, that is at the so-called rail joint, as regards the loads occurring during the passage of a train, whereas because of the influences of temperature changes, a movability of the two rail ends within certain limits is necessary.

The connection between the rails ends at a rail joint is realized in general by splice strips or plates which are arranged on both sides of the rail ends in the splice strip chambers of a railroad track and which bridge the rail joint. A number of differently constructed splice strip connections of rail joints are known in the prior art, some of which are of the nonapertured constructions, for example, T-shaped splice strips which are supported toward the outside by abutments and curved single-layer or multilayer leaf springs which are clamped between the rail head side and a corresponding support plate.

Modern signaling techniques require in ever-increasing measure a durable, reliable insulation for electrically insulated track sections, particularly heavily loaded or heavily traveled rail joints, whereby the ever-increasing traffic also requires particularly favorable economic solutions and constructions which may be rapidly assembled. The numerous constructions demonstrated in practice either have shortcomings in material or in the type of construction. The strong impact- and squeeze- or pressure-effects to which such insulated rail joints are subjected break up the highly loaded insulating material, whereas the vibrations of the superstructure fatigue the same. Additionally, the temperature changes with extreme hot and cold peaks during summer and winter affect in a disadvantageous manner the mechanical properties of the pressure- an wear-resistance of the insulating materials used heretofore. Particularly questionable is the embrittlement thereof with great cold. Also, the fat-, oil- and gasoline-resistance of these insulators is an important factor. Furthermore, the insulating material has to exhibit no conductivity properties with loads occurring over long periods of time in spite of clamping, stressing or pre-stressing of the rail joint connections. Finally, favorable sliding conditions are also desirable in such installations.

According to all presently available experience, insulating splice strips or plates or insulating inserts are needed which can be made of a base material that fulfills all the prerequisites for:

2

(a) A reliable, durable insulation, even in high humidity, (b) A good connection of the rail ends with fully sufficient bearing strength and load capacity, (c) The necessary elasticity, toughness, and wear-, pressure- and impact-resistance in all thicknesses required for different constructions, with each climatic condition—heat in the summer and cold in the winter—and under all installation conditions—soiling by fat, oil, gasoline, sand, rust, and steel particles, (d) A good and durable deformability for adaption to the superstructural requirements of an effective, easily-built and reliably acting assembly in all the possible practical constructions or designs, either as a compact mass or as a thin layer, and (e) Economically-designed constructions.

For example, the insulation of rail joint connections by such a highly resistant insulating material would enable the manufacture from insulating material of:

(a) Load bearing solid splice strips or plates, (b) Thin insulating inserts for solid steel splice strips without a significant reduction in the cross section thereof, and (c) Thin, large-surfaced insulating inserts for highly elastic leaf spring splice strips for the nonapertured connection of rail ends.

One of the objects of the present invention is to provide electrically insulating rail joint connections which overcome the disadvantages and deficiencies of the prior art connections.

Another object of the present invention is to provide electrically insulating rail joint connections which provide a reliable, durable insulation while also having fully sufficient bearing strength and load capacity to give a good connection of rail ends.

A further object of the invention is to provide electrically insulating rail joint connections which have the requisite properties of elasticity, toughness, deformability and wear-, pressure- and impact-resistance for the different varieties of rail joint connection constructions and designs, either as a compact mass or as a thin layer, effective in either hot or cold climatic conditions.

A still further object of the present invention is to provide electrically insulating rail joint connections which can be made quite economically.

These and other objects of the present invention will become apparent to those skilled in the art from a reading of the drawings, specification and claims herein.

A practical embodiment of the invention is represented in the accompanying drawings wherein:

FIGURE 1 represents a side elevation of a solid strip electrically insulated rail joint connection together with an adjacent tie and tie plate on which the rail is secured.

FIGURE 2 represents a transverse vertical section on the line I—I of FIGURE 1, on an enlarged scale.

Figure 3:
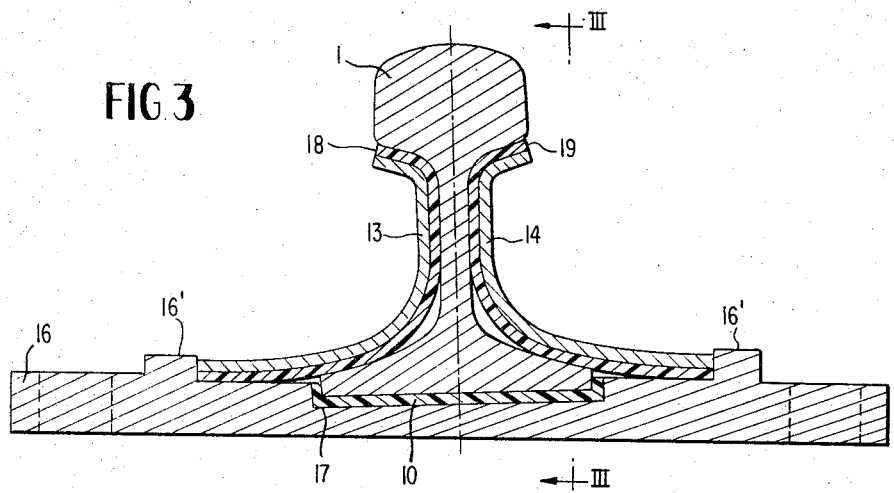
FIGURE 3 is a transverse cross sectional view of a modified embodiment of a rail joint in accordance with the present invention.

Referring to the drawings, a rail joint is shown as comprising the adjacent ends of the two steel rails 1 and 2, a pair of splice strips or plates 3 and 4 made of the plastic material of the present invention and bolts 5. The rails are supported in the customary manner upon wooden ties 6 to which they are secured by means of spikes 7, with or without the interposition of tie plates 8.

Figure 4:
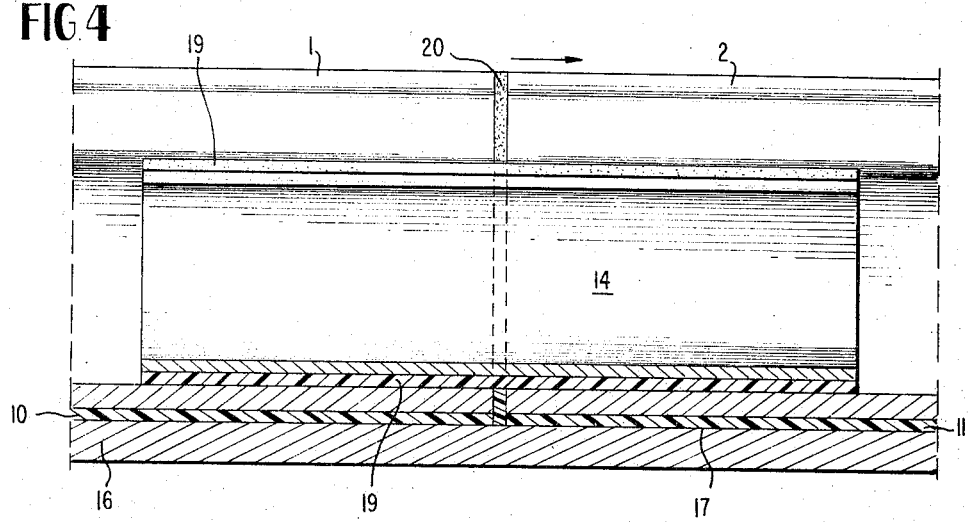
FIGURE 4 is a cross sectional view taken along line III—III of FIGURE 3.

FIGURES 3 and 4 show another screwless version of a rail joint connection by using the materials according to the present invention. The rail joint connection consisting of the spring shackles 13 and 14 and the support plate 16 is arranged on both sides of the rail ends 1 and 2 and bridges the gap between the rail ends. The two spring shackles 13 and 14 are clamped in that way between the angle formed by the rail head bottom side and the rail web with strips 16′ being provided on both sides of the rail ends 1 and 2 on support plate 16, that the rail ends 1 and 2 and the support plate 16 are positively connected together. The spring shackles 13 and 14 are so shaped that they lie as close as possible against the rail head bottom side, the rail web, and the rail foot. To prevent any lateral shifting, the rail feet are secured by a suitable recess 17 of the support plate 16.

The electrically insulating plastic layers 18 and 19 lie between the spring shackles 13 and 14 and the rail which is electrically insulated at its foot towards the support plate 16 by an intermediate layer 10 and 11, respectively, which is made by the materials according to the present invention.

As shown in FIGURE 4 the electric separation between the two rail ends 1 and 2 can be made by an intermediate layer 20 consisting of the materials according the invention, having a cross section corresponding the cross section of the rails.

The present invention proposes insulations which fulfill the aforementioned requirements in their entirety. The electrically insulating rail joint connections of the present invention consist of form parts, sectional profile elements or bent plates made according to the press-mold or transfer-mold process and consist of cross-linked polyolefins and/or polyolefin polymers, preferably cross-linked polyethylene and/or polyethylene-mixed polymerizates containing fillers, including compositions with high filler contents.

As polyolefins and polyolefin copolymers suitable for use in the present invention, there may be mentioned, by way of example, polyethylene, polypropylene, polybutylene, ethylene-propylene copolymers, ethylene-butylene copolmers, ethylene-vinyl acetate copolymers, etc. The choice of polymer depends upon the specific requirements needed in various constructions and conditions. Polyethylene is particularly preferred. Both high density (>0.94) and low density (<0.94) polyethylene are suitable in making electrically insulated rail joint connections in accordance with the present invention, depending on the requirements sought to be met.

Carbon black is the preferred filler. Carbon black having a high purity, 98% and above, is particularly preferred. GPF (general purpose furnace), HAF (high abrasive furnace), SRF (semi-reinforcing channel) and HPC (hard processing channel) carbon blacks have been found quite suitable for use herein. If high contents of carbon black up to 45% by weight or more are used, thermal carbon blacks as MT (medium thermal black) of FT (fine thermal black) are to prefer.

In addition to carbon black, other substances, such as metal oxides, metal carbonates, silicates, etc., may be utilized as fillers in the insulating connections of the present invention. Examples of these other fillers include $SiO_2$, $Fe_2O_3$, $CaCO_3$ $Al_2O_3$, aluminium silicate, kaolin, etc. The amount of filler material to be employed depends upon the particular type of filler used. If carbon black is used, it is advisable to employ it in amounts of from 10 to 60% by weight, relative to the weight of the total mixture. Preferably, 20 to 50% by weight of carbon black is used. The proportion to be used of the other fillers mentioned above, besides carbon black depends on the specific weight of the filler. The optimal range in volume percent-content is the same as that of carbon black.

In accordance with the present invention, the use of finely grained carbon blacks having a grain or particle size of between about 50 and 4000 A. has been found to be particularly advantageous. Fillers of such fineness make it possible to obtain a homogeneity of rail joint connectors desired for a flawless operation.

The electrically insulating rail joint connections are manufactured according to the conventional methods known in the art. For example, if a rail joint connection is to be made from polyethylene, a cross-linking of the polyethylene to be utilized is first effected by the addition thereto of a suitable cross-linking agent. Organic peroxides are quite suitable for this purpose, especially those that decompose into oxy-radicals at high temperatures. Peroxides containing an oxygen bonded to a tertiary carbon atom are particularly useful. The preferred cross-linking agent is dicumyl peroxide. Other cross-linking agents include, by way of example, di-t-butyl peroxide, di-t-amyl peroxide, 2,5-dimethyl-2′,5′-di-t-butylperoxy hexane, 2,5-dimethyl-2′,5′-di-t-butylperoxy hexyne, bis($\alpha$ - t - butyl - p-isopropylbenzyl) peroxide, and bis($\alpha$-t-butyl-m-isopropylbenzyl) peroxide.

The amount of cross-linking agent used in making the cross-linked polyolefin electrically insulating rail joint connections may be varied widely depending on the type of polyolefin used, the ratio of polyolefin to filler, and the cross-linking effectiveness of the peroxide. Generally, an amount of peroxide of from about 1 to 6%, based on the weight of the mixture, is effective.

Admixture of the components can be effected by conventional methods, for example, working on a roller mill, in a Banbury mixer, in a kneader, etc. Preferably, the polyolefin is added first, then the filler, and the cross-linking agent last. If polyethylene and carbon black are used, they are admixed at temperatures above the softening point of the polyethylene. After a thorough blending thereof, the peroxide is worked in at temperatures of, for example, 110° to 130° C. The mixing of the components may be accomplished over a wide range of temperatures but care should be exercised in preventing scorching. In general, blending is carried out at a temperature just below the activation temperature of the peroxide or cross-linking agent used.

After the mixture has become homogeneous, the composition is molded in a conventional manner to give the desired rail joint connection, whether it be a solid splice strip, an insulating insert, etc.

Curing of the composition can be accomplished at ordinary pressures or at super-atmospheric pressures, such as from 10 to 1,000 pounds per square inch or more in a mold press. Generally, the cure takes place at temperatures of between 150° and 200° C.

The following examples are showing some kinds of materials which can be used in the meaning of the invention's material. They are not ruling for a definite use as the practical requirements to such rail joint connections can be very different; for instance the choice of material depends on the daily loads during the passage of a train, the max. pressure, and the climatic zone (arctics, tropics, etc.) in which the rail tracks are used and by what tension the electric regulating devices are controlled.

The possibilities shown in the following table have been made in the usual and known manner, i.e. the polymer has been heating up to its fusing temperature, plasticized, and the filler has been worked in up to a favourable homogeneity; then at a temperature at which the mixture yet is plastic the peroxide has been distributed within a few minutes. This can be done by a rolling mill or a usual mixing apparatus. The granulated material received after cooling has been pressed to the wanted rail insulations with 180° C. and a specific pressure of 200 kgs./cm.² with a time of hardening of approx. 1 min./mm. wall thickness.

TABLE I

| Ex. | Polymer | Filler (wt.) | Peroxide | Tensile strength (kp./cm.²) | E-modul | Impact strength notched at −30° C. (cmkp./cm.²) | Specific resistance (ohm-cm.) |
|---|---|---|---|---|---|---|---|
| 1 | 65% HD-PE | 35% GPF-black | 4% DICUP | 350 | 14,000 | 55 | 10⁴ |
| 2 | 50% HD-PE | 50% MT-black | 5% DICUP | 350 | 12,000 | 50 | 10¹² |
| 3 | 50% HD-PE | 50% SiO₂ | 5% DICUP | 400 | 20,000 | 15 | 10¹⁴ |
| 4 | 50% LD-PE | 50% MT-black | 5% DICUP | 250 | 9,000 | 40 | 10¹⁵ |
| 5 | 70% LD-PE | 30% SiO₂ | 3% DICUP | 250 | 10,000 | 30 | 10¹⁵ |
| 6 | 45% EPR | 55% MT-black | 4% DICUP | 165 | 6,000 | 15 | 10¹⁵ |
| 7 | 55% PE/PVAc | 45% GPF-black | 6% DICUP | 150 | 4,000 | 10 | 10⁶ |

REMARKS:
HD-PE = high density polyethylene; η Red. = 2.5; i₅ = 1.5.
LD-PE = low density polyethylene; D = 0.92.
EPR = ethylene/propylene rubber; D = 0.87; propylene 40%.
DICUP = dicumylperoxide.
PE/PVAc = pethylene-polyvinylacetate copolymer; 45% acetate D = 0.98.

The resultant insulated connections come up to the requirements of temperature-, pressure-, notched bar impact-, shock-, weather- and aging-resistance and durability without wear while maintaining the desired electrical properties.

By varying the type and quantity of the polymer and filler material, as well as of the degree of cross-linking, corresponding adjustments are possible with individual rail joint connections which can be matched to specific requirements as regards hardness, rigidity and elasticity.

Similarly, by appropriate selection of the filler material, the conductivity of the connection may be varied greatly without otherwise losing the other desirable properties of the insulation.

The particular advantage of the insulations of the present invention results from the obtained optimum combination of hardness, rigidity, elasticity and toughness or impact resistance of the material, whereas with the use of the customary plastic materials, one obtains either products with sufficient hardness and rigidity but with insufficient tensile strength and resistance to rupture, or elastic materials that are unsatisfatcory as regards rigidity, hardness and durability.

The invention being thus described, it will be obvious that the same may be varied in many ways. Such variations are not to be regarded as a departure from the spirit and scope of the invention and all such modifications are intended to be included within the scope of the following claims.

We claim:
1. A solid, unitary insulating rail joint connection consisting essentially of a plastic material selected from the group consisting of cross-linked polyolefins and copolymers thereof with other ethylenically unsaturated monomers, said plastic material containing about 10 to 60% by weight, based on the total composition, of a filler material.

2. The insulating rail joint of claim 1, wherein said polyolefin is polyethylene.

3. The insulating rail joint of claim 1, wherein the filler material is selected from the group consisting of carbon black, metal oxides, metal carbonates and silicates.

4. The insulating rail joint of claim 3, wherein the filler material is high-temperature carbon black.

5. The insulating rail joint of claim 4, wherein the carbon black has a particle size of about 50 to 4,000 A.

6. A solid, unitary insulating rail joint connection consisting essentially of a plastic material selected from the group consisting of cross-linked polyethylene and copolymers thereof with other ethylenically unsaturated monomers, said plastic material containing about 20 to 50% by weight, based on the total composition, of a high-temperature carbon black filler.

7. The insulating rail joint of claim 6, wherein the carbon black has a particle size of about 50 to 4,000 A.

8. A process for manufacturing a solid, unitary, rail joint connection which consists essentially of mixing a material selected from the group consisting of polyolefins and copolymers thereof with other ethylenically unsaturated monomers, with about 10 to 60% by weight, based on the total composition, of a filler material, until the mixture is substantially homogeneous, adding about 1 to 6% by weight, based on the total composition, of a cross-linking agent, working the mixture at a temperature of about 120° C., and molding said mixture into a rail joint connection under high temperature and high pressure.

9. The process of claim 8, wherein the polyolefin is polyethylene and the filler material is carbon black.

10. The process of claim 9, wherein the molding temperature is about 180° C. and the molding pressure is about 200 kg./cm.².

11. A railroad rail joint consisting essentially of rail end portions essentially abutting each other, a plastic element having a surface complementary to at least a substantial portion of the lateral surfaces of said rail end portions, on both sides of said rail end portions and connecting said abutting end portions to form a rail joint, said plastic element having a composition comprising a plastic material selected from the group consisting of cross-linked polyolefins and copolymers thereof with other ethylenically unsaturated monomers, said plastic material containing about 10 to 60% by weight, based on the total composition, of a filler material.

12. The railroad rail joint of claim 11, wherein the polyolefin is polyethylene and the filler material is carbon black.

13. The railroad rail joint of claim 11, wherein the abutting surfaces of the rail end portions are in contact with a plastic element having said plastic composition.

14. The railroad rail joint of claim 11, wherein rail sections are insulated at their feet from a support plate by a plastic element having said plastic composition.

15. The railroad rail joint of claim 11, which includes bolts so disposed as to hold the plastic elements in close proximity to the rail end portions.

16. The railroad rail joint of claim 11, wherein spring shackles having a surface complementary to the plastic elements form part of the rail joint.

References Cited
UNITED STATES PATENTS

| | | | |
|---|---|---|---|
| 2,888,424 | 5/1959 | Precopio et al. | 260—41 |
| 3,012,020 | 12/1961 | Kirk et al. | 260—88.2 |
| 3,100,080 | 8/1963 | Fiechter | 238—159 |

FOREIGN PATENTS

| | | |
|---|---|---|
| 666,009 | 7/1963 | Canada. |
| 796,058 | 6/1958 | Great Britain. |

ARTHUR L. LA POINT, *Primary Examiner.*

R. A. BERTSCH, *Assistant Examiner.*